US010508835B2

(12) United States Patent
Ishiyama et al.

(10) Patent No.: US 10,508,835 B2
(45) Date of Patent: Dec. 17, 2019

(54) REFRIGERATION CYCLE APPARATUS

(71) Applicant: Mitsubishi Electric Corporation, Tokyo (JP)

(72) Inventors: Hiroki Ishiyama, Tokyo (JP); Yohei Kato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 353 days.

(21) Appl. No.: 15/313,625

(22) PCT Filed: Jul. 23, 2014

(86) PCT No.: PCT/JP2014/069492
§ 371 (c)(1),
(2) Date: Nov. 23, 2016

(87) PCT Pub. No.: WO2016/013077
PCT Pub. Date: Jan. 28, 2016

(65) Prior Publication Data
US 2017/0146269 A1 May 25, 2017

(51) Int. Cl.
*B60H 1/00* (2006.01)
*F25B 13/00* (2006.01)
(Continued)

(52) U.S. Cl.
CPC ............. *F25B 13/00* (2013.01); *F25B 39/00* (2013.01); *F25B 41/04* (2013.01); *F25B 39/04* (2013.01); *F25B 2600/2501* (2013.01)

(58) Field of Classification Search
CPC .......... F25B 13/00; F25B 41/04; F25B 40/00; F25B 39/00; F25B 700/2103; F25B 39/04;
(Continued)

(56) References Cited

U.S. PATENT DOCUMENTS 4,179,894 A * 12/1979 Hughes ............... F24D 11/0221
62/79
4,236,381 A * 12/1980 Imral ....................... F25B 13/00
62/324.1
(Continued)

FOREIGN PATENT DOCUMENTS

JP    H05-45007 A    2/1993
JP    2003-65616 A   3/2003
(Continued)

OTHER PUBLICATIONS

International Search Report of the International Searching Authority dated Oct. 28, 2014 for the corresponding International application No. PCT/JP2014/069492 (and English translation).

*Primary Examiner* — Claire E Rojohn, III
(74) *Attorney, Agent, or Firm* — Posz Law Group, PLC

(57) ABSTRACT

A refrigeration cycle apparatus includes at least a compressor, a condenser, an internal heat exchanger configured to exchange heat between parts of refrigerant each having a different pressure, a refrigerant reservoir configured to store the refrigerant, a first pressure reducing device, an evaporator. The compressor, the condenser, the internal heat exchanger, the refrigerant reservoir, the first pressure reducing device, and the evaporator are sequentially connected to each other. The refrigeration cycle apparatus also includes a first pipe connecting the condenser and the refrigerant reservoir, and a second pressure reducing device provided to the first pipe between the internal heat exchanger and the refrigerant reservoir.

6 Claims, 9 Drawing Sheets

(51) Int. Cl.
*F25B 39/00* (2006.01)
*F25B 41/04* (2006.01)
*F25B 39/04* (2006.01)

(58) Field of Classification Search
CPC ...... F25B 2600/2501; F25B 2600/2313; F25B 2600/005; F25B 2313/0233; F25B 2313/0294; F25B 2339/047; F25B 2341/0662; F25B 2400/0415; F25B 2400/16; F25B 2600/112; F25B 2600/2513; Y02B 30/743
USPC ........................................................ 62/196.1
See application file for complete search history.

(56) References Cited

U.S. PATENT DOCUMENTS

| | | | | |
|---|---|---|---|---|
| 4,286,435 | A * | 9/1981 | Cann | F25B 13/00 62/196.1 |
| 4,308,042 | A * | 12/1981 | Ecker | F24D 11/0221 62/82 |
| 5,692,394 | A * | 12/1997 | Ozaki | F25B 1/10 62/509 |
| 2001/0003311 | A1 * | 6/2001 | Karl | B60H 1/00921 165/202 |
| 2005/0262873 | A1 * | 12/2005 | Hirota | F25B 41/04 62/503 |
| 2010/0186440 | A1 * | 7/2010 | Hong | B60H 1/005 62/434 |
| 2011/0219794 | A1 * | 9/2011 | Shiba | F25B 45/00 62/125 |
| 2012/0318008 | A1 * | 12/2012 | Liu | F25B 9/008 62/115 |
| 2014/0174114 | A1 * | 6/2014 | Tamaki | F25B 45/00 62/129 |
| 2014/0245769 | A1 * | 9/2014 | Vandermeulen | F25B 29/006 62/238.3 |
| 2015/0027162 | A1 * | 1/2015 | Ohno | B60H 1/00278 62/525 |
| 2015/0047579 | A1 * | 2/2015 | Thomson | F22B 1/18 122/15.1 |
| 2015/0211772 | A1 * | 7/2015 | Shimazu | F25B 40/02 62/196.4 |
| 2015/0219370 | A1 * | 8/2015 | Kato | B29C 70/46 62/238.7 |
| 2015/0275895 | A1 * | 10/2015 | Tanaka | F04C 18/34 418/15 |
| 2016/0200175 | A1 * | 7/2016 | Nakajima | F25B 40/02 62/500 |
| 2016/0209094 | A1 * | 7/2016 | Yokoyama | F25B 41/00 |
| 2016/0273795 | A1 * | 9/2016 | Takenaka | F24F 13/30 |
| 2017/0010052 | A1 * | 1/2017 | Lenk | F25B 30/02 |
| 2017/0197490 | A1 * | 7/2017 | Enomoto | F25B 1/00 |
| 2017/0198943 | A1 * | 7/2017 | Oka | F25B 49/02 |
| 2017/0261242 | A1 * | 9/2017 | Yasuo | F24F 11/89 |
| 2017/0268792 | A1 * | 9/2017 | Costakis | F24F 11/83 |
| 2017/0350624 | A1 * | 12/2017 | Kawakubo | F25B 39/028 |
| 2018/0328626 | A1 * | 11/2018 | Moriyama | F25B 31/004 |
| 2018/0363965 | A1 * | 12/2018 | Hayamizu | C09K 5/045 |
| 2018/0372382 | A1 * | 12/2018 | Saha | F25B 13/00 |
| 2019/0203993 | A1 * | 7/2019 | Lesmerises | F25B 1/10 |

FOREIGN PATENT DOCUMENTS

| | | | |
|---|---|---|---|
| JP | 2008-98095 | A | 4/2008 |
| JP | 2009-30954 | A | 2/2009 |
| JP | 2011-52884 | A | 3/2011 |
| JP | 2011052884 | A * | 3/2011 |
| WO | 2008/117408 | A1 | 10/2008 |

* cited by examiner

US 10,508,835 B2

REFRIGERATION CYCLE APPARATUS

CROSS REFERENCE TO RELATED APPLICATION

This application is a U.S. national stage application of PCT/JP2014/069492 filed on Jul. 23, 2014, the contents of which are incorporated herein by reference.

TECHNICAL FIELD

The present invention relates to a refrigeration cycle apparatus including an internal heat exchanger.

BACKGROUND

A related-art refrigeration cycle apparatus is generally known that includes an internal heat exchanger, in which refrigerant on a high-pressure side and refrigerant on a low-pressure side exchange heat, liquid refrigerant flowing into a pressure reducing device is subcooled, and gas refrigerant at an outlet of an evaporator is superheated to improve efficiency of a refrigeration cycle.

In such a refrigeration cycle apparatus, to suppress a high pressure in a condenser, a degree of subcooling at a high-pressure side flow outlet of the internal heat exchanger is held at a predetermined value to suppress generation of subcooled liquid in the condenser and to enhance heat exchange efficiency (see Patent Literature 1).

PATENT LITERATURE

Patent Literature 1: Japanese Unexamined Patent Application Publication No. 2011-052884

In a related-art refrigeration cycle apparatus including an internal heat exchanger, to suppress a high pressure of a condenser during high temperature hot water output, generation of subcooled liquid in the condenser is suppressed. Thus, in subcooling operation, surplus refrigerant is generated in a refrigeration cycle.

SUMMARY

The present invention has been made to solve such a problem, and an object of the present invention is to, in a refrigeration cycle apparatus including an internal heat exchanger, store surplus refrigerant generated in subcooling operation in a refrigerant reservoir having a minimum capacity.

A refrigeration cycle apparatus according to one embodiment of the present invention includes at least a compressor, a condenser, an internal heat exchanger configured to exchange heat between parts of refrigerant each having a different pressure, a refrigerant reservoir configured to store the refrigerant, a first pressure reducing device, an evaporator. The compressor, the condenser, the internal heat exchanger, the refrigerant reservoir, the first pressure reducing device, and the evaporator are sequentially connected to each other. The refrigeration cycle apparatus also includes a first pipe connecting the condenser and the refrigerant reservoir, and a second pressure reducing device provided to the first pipe between the internal heat exchanger and the refrigerant reservoir.

In the refrigeration cycle apparatus according to the one embodiment of the present invention, the refrigerant subcooled by the internal heat exchanger is decompressed into a saturated liquid or two-phase gas-liquid refrigerant similar to a saturated liquid by the second pressure reducing device and flows into the refrigerant reservoir. Surplus refrigerant can therefore be stored to the greatest extent, and thus, a capacity of the refrigerant reservoir can be reduced. Further, the refrigerant that flows in the refrigerant reservoir is not in a subcooled state, and thus mixes with a gas component to some extent, enabling the inside of the refrigerant reservoir to be prevented from becoming filled up.

DETAILED DESCRIPTION

Embodiments of the present invention are described below with reference to the drawings. Note that, the present invention is not limited to the embodiments described below.

Embodiment 1

<Configuration>

Figure 1:
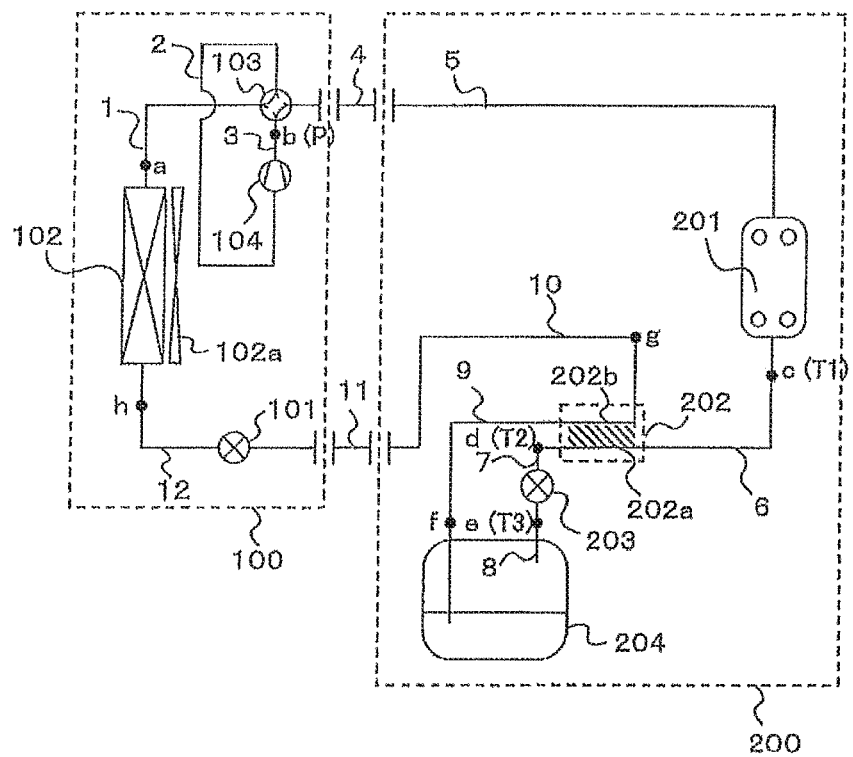
FIG. 1 is a block diagram of a refrigeration cycle apparatus according to Embodiment 1 of the present invention.

FIG. 1 is a block diagram of a refrigeration cycle apparatus according to Embodiment 1 of the present invention.

Figure 2:
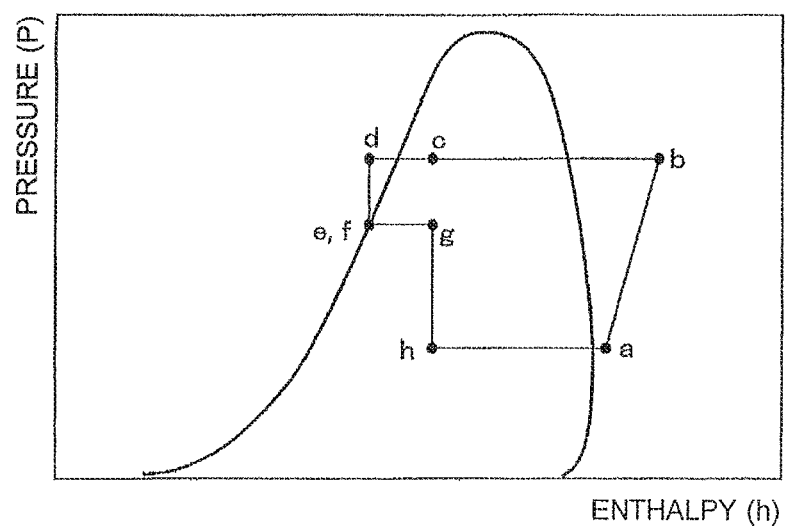
FIG. 2 is a Mollier diagram of the refrigeration cycle apparatus according to Embodiment 1.

FIG. 2 is a Mollier diagram of the refrigeration cycle apparatus according to Embodiment 1.

As illustrated in FIG. 1, the refrigeration cycle apparatus according to Embodiment 1 includes a refrigerant circuit in which an outdoor unit 100 and a heat transfer unit 200 are connected via a gas connection pipe 4 and a liquid connection pipe 11.

A first pressure reducing device 101, an evaporator 102, a four-way valve 103, and a compressor 104 are housed in the outdoor unit 100.

In the outdoor unit 100, the evaporator 102 provided with a fan 102a and the four-way valve 103 are connected via a pipe 1, the four-way valve 103 and a suction side of the compressor 104 are connected via a pipe 2, and a discharge side of the compressor 104 and the gas connection pipe 4 are connected via a pipe 3. Further, the liquid connection pipe 11, the first pressure reducing device 101, and the evaporator 102 are connected via a pipe 12.

Next, a condenser 201 (for example, water-refrigerant heat exchanger), an internal heat exchanger 202, a second pressure reducing device 203, and a refrigerant reservoir 204 are housed in the heat transfer unit 200.

In the heat transfer unit 200, the gas connection pipe 4 and the condenser 201 are connected via a pipe 5, and the condenser 201 and a high-temperature-side path 202a of the internal heat exchanger 202 are connected via a pipe 6. Further, the high-temperature-side path 202a of the internal heat exchanger 202 and the second pressure reducing device 203 are connected via a pipe 7, and the second pressure reducing device 203 and the refrigerant reservoir 204 are connected via a pipe 8. Further, the refrigerant reservoir 204 and a low-temperature-side path 202b of the internal heat exchanger 202 are connected via a pipe 9, and the low-temperature-side path 202b of the internal heat exchanger 202 and the liquid connection pipe 11 are connected via a pipe 10.

A pressure gauge P configured to detect a discharge pressure of the compressor is provided at a point b in FIG. 1, and thermometers T1, T2, and T3 configured to detect temperatures of the refrigerant are provided at a point c, a point d, and a point e, respectively.

<Operation>

Description is made with reference to FIG. 1 and FIG. 2. Points a to h in FIG. 1 correspond to state points a to h, respectively, on the Mollier diagram of FIG. 2.

In the refrigeration cycle apparatus according to Embodiment 1, when the compressor 104 is driven, a high pressure vapor refrigerant b compressed by the compressor 104 is condensed by the condenser 201 into high pressure two-phase gas-liquid refrigerant c and flows into the high-temperature-side path 202a of the internal heat exchanger 202. The high pressure two-phase gas-liquid refrigerant is cooled by medium pressure two-phase gas-liquid refrigerant in the internal heat exchanger 202 into subcooled liquid refrigerant d and flows into the second pressure reducing device 203. The high pressure subcooled liquid refrigerant is decompressed in the second pressure reducing device 203 into medium pressure saturated liquid (or two-phase gas-liquid) refrigerant e and flows into the refrigerant reservoir 204, and the refrigerant is discharged from the refrigerant reservoir 204 in a single-phase liquid state f.

The single-phase liquid refrigerant discharged from the refrigerant reservoir 204 flows into the low-temperature-side path 202b of the internal heat exchanger 202, becomes two-phase refrigerant g while cooling the high pressure two-phase gas-liquid refrigerant, and is discharged. The two-phase refrigerant g flows into the liquid connection pipe 11 and then flows into the first pressure reducing device 101. The refrigerant is decompressed in the first pressure reducing device 101 into a low pressure two-phase refrigerant h and flows into the evaporator 102. The refrigerant exchanges heat with air in the evaporator 102 to become low pressure vapor refrigerant a, and is sucked and compressed again by the compressor 104.

A controller (not shown) detects the temperatures of the refrigerant passing the points c, d, and e with the thermometers T1, T2, and T3, respectively, detects a measurement value of the discharge pressure of the compressor 104, and exercises capacity control over the respective pressure reducing devices and the fan so that the refrigerant at the point d is held at a predetermined degree of subcooling (for example, 5 degrees C.), the refrigerant at the point c is in the two-phase gas-liquid state, and further, the refrigerant at the point e is the saturated liquid or the two-phase gas-liquid refrigerant similar to the saturated liquid.

<Effects>

In the refrigeration cycle apparatus according to Embodiment 1, through increase of a quality (dryness) of the refrigerant at an outlet of the condenser 201 and discharge of the refrigerant from the condenser 201 in the two-phase gas-liquid state c, the inside of the condenser 201 has no subcooled liquid with an inferior heat transfer property to improve heat exchange ability of the condenser 201. The heat exchange ability of the condenser 201 is improved, and thus, an upper limit of a tapping temperature can be raised from that of the related art (for example, from 55 degrees C. to 60 degrees C.). Further, a condensation pressure when the high temperature hot water is discharged can be set to be low, and thus, efficiency of the refrigeration cycle apparatus can be improved.

Further, the refrigerant flows into the refrigerant reservoir 204 as the saturated liquid or the two-phase gas-liquid refrigerant similar to the saturated liquid, and thus, surplus refrigerant can be stored to the greatest extent. At this time, the refrigerant flows into the refrigerant reservoir 204 under a state in which a gas component is mixed in the refrigerant to some extent, and thus, the inside of the refrigerant reservoir can be prevented from becoming filled up.

Further, the refrigerant at an outlet of the high-temperature-side path 202a of the internal heat exchanger 202 flows into the second pressure reducing device 203 as a single-phase liquid, and thus, flow rate controllability can be improved.

Further, commonality of the configuration of the outdoor unit 100 can be achieved to reduce costs of the refrigeration cycle apparatus.

Modified Example 1

Modified Example 1 of the refrigeration cycle apparatus according to Embodiment 1 is described with reference to FIG. 3.

Figure 3:
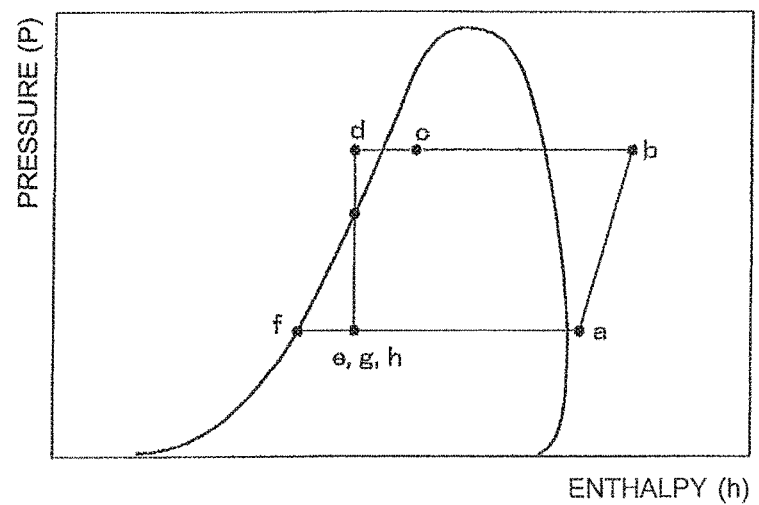
FIG. 3 is a Mollier diagram of Modified Example 1 of the refrigeration cycle apparatus according to Embodiment 1.

FIG. 3 is a Mollier diagram of Modified Example 1 of the refrigeration cycle apparatus according to Embodiment 1.

In Modified Example 1, as shown in FIG. 3, the refrigerant that is cooled by low pressure two-phase gas-liquid refrigerant in the internal heat exchanger 202 into the subcooled liquid refrigerant d and that flows into the second pressure reducing device 203 is decompressed in the second pressure reducing device 203 into low pressure saturated liquid refrigerant f, flows out of the refrigerant reservoir 204, and flows into the low-temperature-side path 202b of the internal heat exchanger 202. The refrigerant is heated in the internal heat exchanger 202 into two-phase refrigerant g, and flows into the first pressure reducing device 101. At this time, the first pressure reducing device 101 is fully open.

<Effects>

Modified Example 1 of the refrigeration cycle apparatus according to Embodiment 1 has, in addition to the effects of the refrigeration cycle apparatus according to Embodiment 1 described above, an effect that the refrigerant decompressed from a high pressure state (state d) to a low pressure state (state e) by the second pressure reducing device 203 causes an increased difference between the high pressure and the low pressure during heat exchange in the internal heat exchanger 202, and thus, a heat exchange amount between the high pressure refrigerant and the low pressure refrigerant can be increased.

Further, the refrigerant at the outlet of the high-temperature-side path 202a of the internal heat exchanger 202 is the single-phase liquid and flows into the second pressure reducing device 203, and the first pressure reducing device 101 is controlled to be fully open, and thus, the flow rate controllability can be improved.

Modified Example 2

Modified Example 2 of the refrigeration cycle apparatus according to Embodiment 1 is described with reference to FIG. 4.

Figure 4:
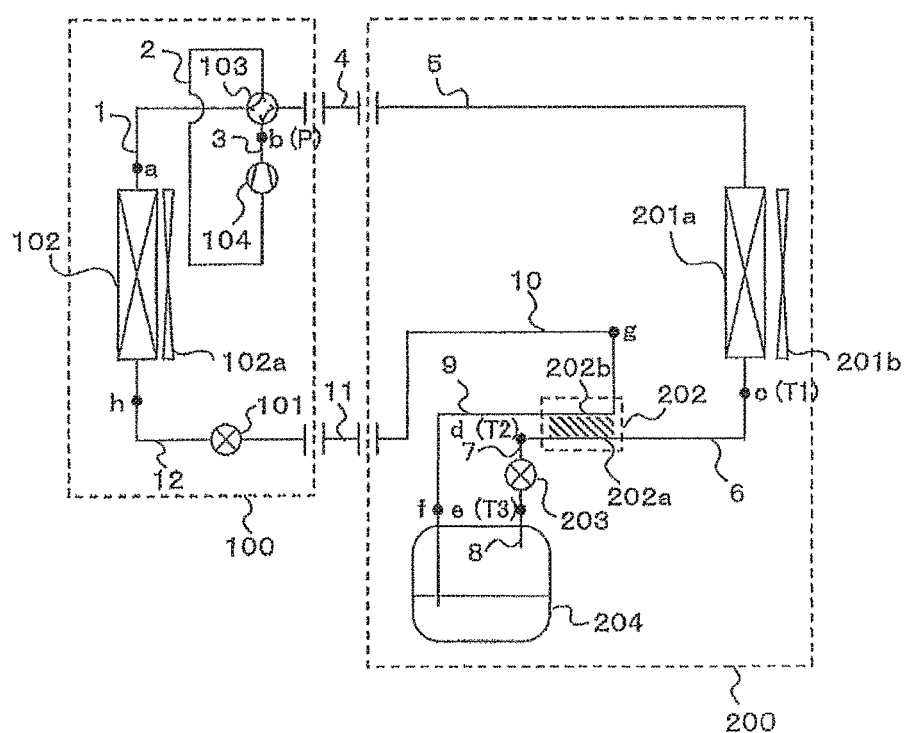
FIG. 4 is a block diagram of Modified Example 2 of the refrigeration cycle apparatus according to Embodiment 1.

FIG. 4 is a block diagram of Modified Example 2 of the refrigeration cycle apparatus according to Embodiment 1.

In Modified Example 2, as illustrated in FIG. 4, an air-refrigerant heat exchanger 201a is adopted as the condenser 201 provided with a fan 201b.

<Effects>

Modified Example 2 of the refrigeration cycle apparatus according to Embodiment 1 has, in addition to the effects of the refrigeration cycle apparatus according to Embodiment 1 described above, an effect that high pressure rise of the air-refrigerant heat exchanger can be suppressed.

Modified Example 3

Modified Example 3 of the refrigeration cycle apparatus according to Embodiment 1 is described with reference to FIG. 5.

Figure 5:
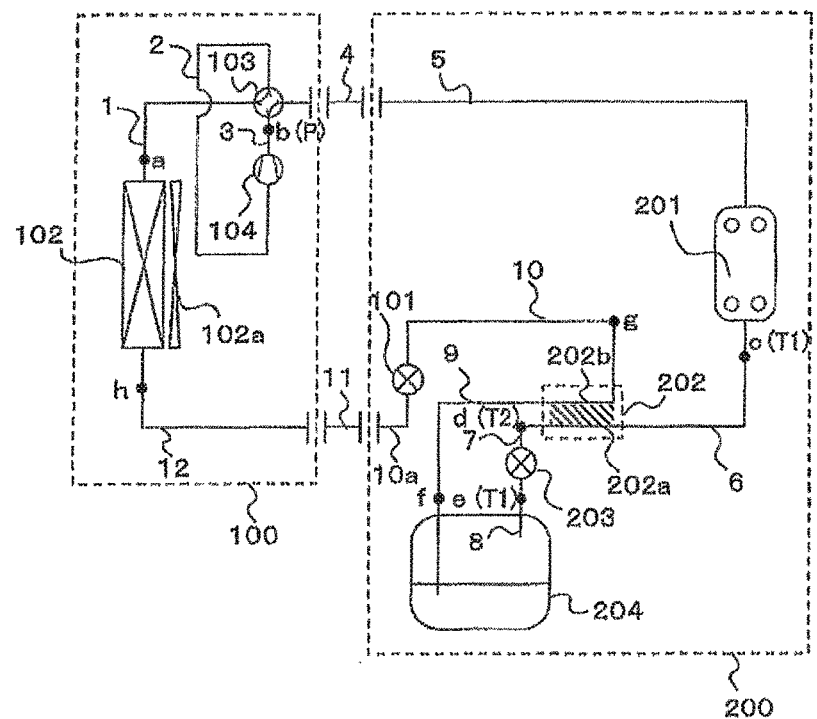
FIG. 5 is a block diagram of Modified Example 3 of the refrigeration cycle apparatus according to Embodiment 1.

FIG. 5 is a block diagram of Modified Example 3 of the refrigeration cycle apparatus according to Embodiment 1.

In Modified Example 3, the first pressure reducing device 101 is provided to the pipe 10 in the heat transfer unit 200.

<Effects>

Even when the refrigeration cycle apparatus according to Modified Example 3 has such a configuration, effects similar to those of the refrigeration cycle apparatus according to Embodiment 1 described above can be obtained.

Embodiment 2

<Configuration>

Figure 6:
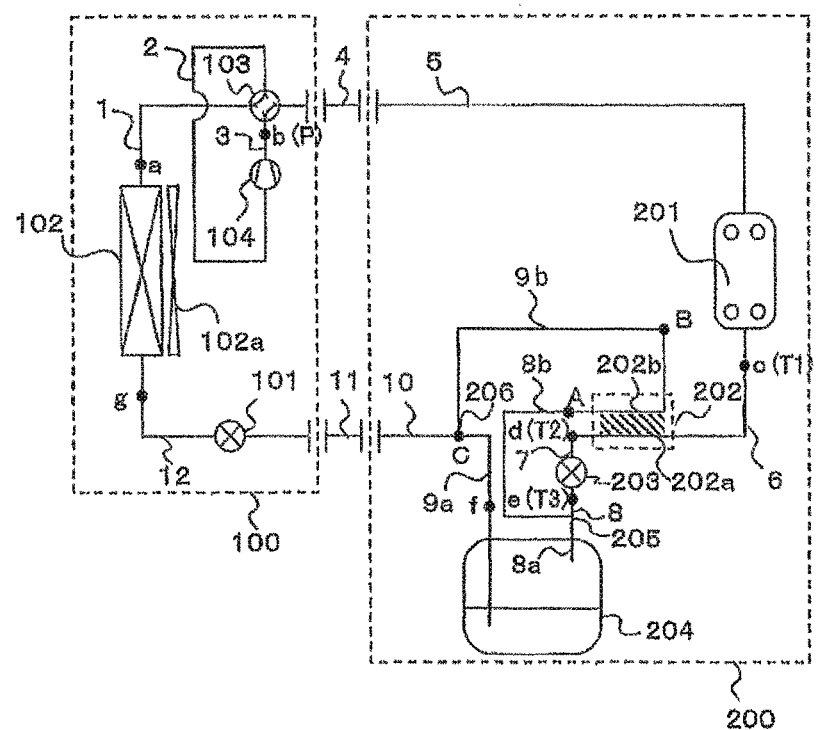
FIG. 6 is a block diagram of a refrigeration cycle apparatus according to Embodiment 2 of the present invention.

FIG. 6 is a block diagram of a refrigeration cycle apparatus according to Embodiment 2 of the present invention.

Figure 7:
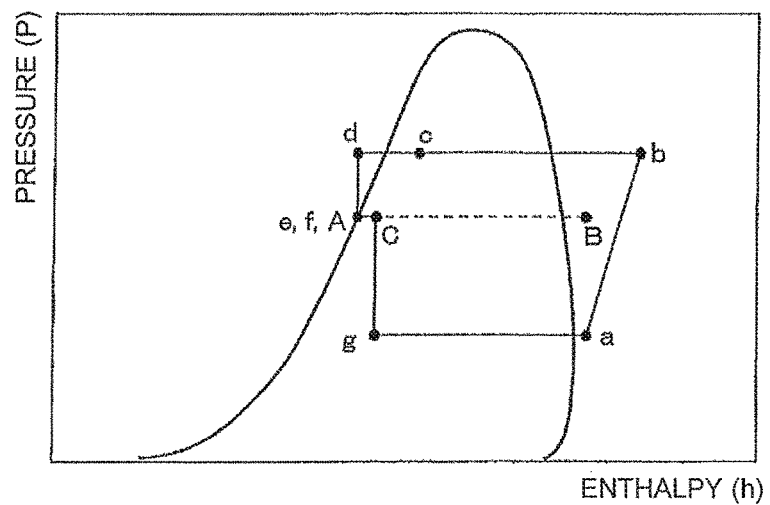
FIG. 7 is a Mollier diagram of the refrigeration cycle apparatus according to Embodiment 2.

FIG. 7 is a Mollier diagram of the refrigeration cycle apparatus according to Embodiment 2.

As illustrated in FIG. 6, the refrigeration cycle apparatus according to Embodiment 2 includes a refrigerant circuit in which the outdoor unit 100 and the heat transfer unit 200 are connected via the gas connection pipe 4 and the liquid connection pipe 11.

The first pressure reducing device 101, the evaporator 102, the four-way valve 103, and the compressor 104 are housed in the outdoor unit 100.

In the outdoor unit 100, the evaporator 102 provided with the fan 102a and the four-way valve 103 are connected via the pipe 1, the four-way valve 103 and the suction side of the compressor 104 are connected via the pipe 2, and the discharge side of the compressor 104 and the gas connection pipe 4 are connected via the pipe 3. Further, the liquid connection pipe 11, the first pressure reducing device 101, and the evaporator 102 are connected via the pipe 12.

Next, the condenser 201 (for example, water-refrigerant heat exchanger), the internal heat exchanger 202, the second pressure reducing device 203, and the refrigerant reservoir 204 are housed in the heat transfer unit 200.

In the heat transfer unit 200, the gas connection pipe 4 and the condenser 201 are connected via the pipe 5, and the condenser 201 and the high-temperature-side path 202a of the internal heat exchanger 202 are connected via the pipe 6. Further, the high-temperature-side path 202a of the internal heat exchanger 202 and the second pressure reducing device 203 are connected via the pipe 7, the second pressure reducing device 203 and a branch portion 205 are connected via the pipe 8, and the branch portion 205 and the refrigerant reservoir 204 are connected via a pipe 8a. The refrigerant reservoir 204 and a merging portion 206 are connected via a pipe 9a, and the branch portion 205 and the low-temperature-side path 202b of the internal heat exchanger 202 are connected via a pipe 8b. Further, the low-temperature-side path 202b of the internal heat exchanger 202 and the merging portion 206 are connected via a pipe 9b, and the merging portion 206 and the liquid connection pipe 11 are connected via the pipe 10.

The pressure gauge P configured to detect the discharge pressure of the compressor is provided at the point b in FIG. 6, and the thermometers T1, T2, and T3 configured to detect the temperatures of the refrigerant are provided at the point c, the point d, and the point e, respectively.

<Operation>

Description is made with reference to FIG. 6 and FIG. 7. Points a to g and A to C in FIG. 6 correspond to state points a to g and A to C, respectively, on the Mollier diagram of FIG. 7.

In the refrigeration cycle apparatus according to Embodiment 2, when the compressor 104 is driven, the high pressure vapor refrigerant b compressed by the compressor 104 is condensed by the condenser 201 into the high pressure two-phase gas-liquid refrigerant c and flows into the high-temperature-side path 202a of the internal heat exchanger 202. The high pressure two-phase gas-liquid refrigerant is cooled by medium pressure two-phase gas-liquid refrigerant in the internal heat exchanger 202 into the subcooled liquid refrigerant d and flows into the second pressure reducing device 203. The high pressure subcooled liquid refrigerant is decompressed in the second pressure reducing device 203 into the medium pressure saturated liquid (or two-phase gas-liquid) refrigerant e and flows into the branch portion 205.

The refrigerant that branches at the branch portion 205 flows into the refrigerant reservoir 204 and the low-temperature-side path 202b of the internal heat exchanger 202. The refrigerant flowing into the refrigerant reservoir 204 flows out in the single-phase liquid state f. The refrigerant flowing into the internal heat exchanger 202 in a state A flows out in a state B while cooling the high pressure two-phase gas-liquid refrigerant. The refrigerant flowing out of the refrigerant reservoir 204 and the refrigerant flowing out of the internal heat exchanger 202 merge at the merging portion 206. The refrigerant merging at the merging portion 206 in a state C flows into the liquid connection pipe 11 and flows into the first pressure reducing device 101. The refrigerant in the state C is decompressed in the first pressure reducing device 101 into refrigerant in a state g, and flows into the evaporator 102. The refrigerant exchanges heat with air in the evaporator 102 to become the low pressure vapor refrigerant a, and is sucked and compressed again by the compressor 104.

The controller (not shown) detects the temperatures of the refrigerant passing the points c, d, and e with the thermometers T1, T2, and T3, respectively, detects a measurement value of the discharge pressure of the compressor 104, and exercises capacity control over the respective pressure reducing devices and the fan so that the refrigerant at the point d is held at a predetermined degree of subcooling (for example, 5 degrees C.), the refrigerant at the point c is in the two-phase gas-liquid state, and further, the refrigerant at the point e is the saturated liquid or the two-phase refrigerant similar to the saturated liquid.

<Effects>

In the refrigeration cycle apparatus according to Embodiment 2, similarly to the refrigeration cycle apparatus according to Embodiment 1, through increase of the quality of the refrigerant at the outlet of the condenser 201 and discharge of the refrigerant from the condenser 201 in the two-phase gas-liquid state c, the inside of the condenser 201 has no subcooled liquid with an inferior heat transfer property to improve heat exchange ability of the condenser 201. The heat exchange ability of the condenser 201 is improved, and thus, the upper limit of the tapping temperature can be raised from that of the related art (for example, from 55 degrees C. to 60 degrees C.). Further, the condensation pressure when the high temperature hot water is discharged can be set to be low, and thus, efficiency of the refrigeration cycle apparatus can be improved.

Further, the refrigerant flows into the refrigerant reservoir 204 as the saturated liquid or the two-phase gas-liquid refrigerant similar to the saturated liquid, and thus, surplus refrigerant can be stored to the greatest extent. At this time, the refrigerant flows into the refrigerant reservoir 204 under a state in which a gas component is mixed in the refrigerant to some extent, and thus, the inside of the refrigerant reservoir can be prevented from becoming filled up.

Further, the refrigerant at the outlet of the high-temperature-side path 202a of the internal heat exchanger 202 flows into the second pressure reducing device 203 as a single-phase liquid, and thus, flow rate controllability can be improved.

Further, commonality of the configuration of the outdoor unit 100 can be achieved to reduce costs of the refrigeration cycle apparatus.

In addition to those effects, by causing the refrigerant at the inlet of the low-temperature-side path 202b of the internal heat exchanger 202 to be in the two-phase state, the heat exchange amount in the internal heat exchanger can be increased.

Further, through branching of the refrigerant at the branch portion 205, the amount of the refrigerant flowing through the low-temperature-side path 202b of the internal heat exchanger 202 can be reduced to reduce the size of the internal heat exchanger 202.

Modified Example 1

Modified Example 1 of the refrigeration cycle apparatus according to Embodiment 2 is described with reference to FIG. 8.

Figure 8:
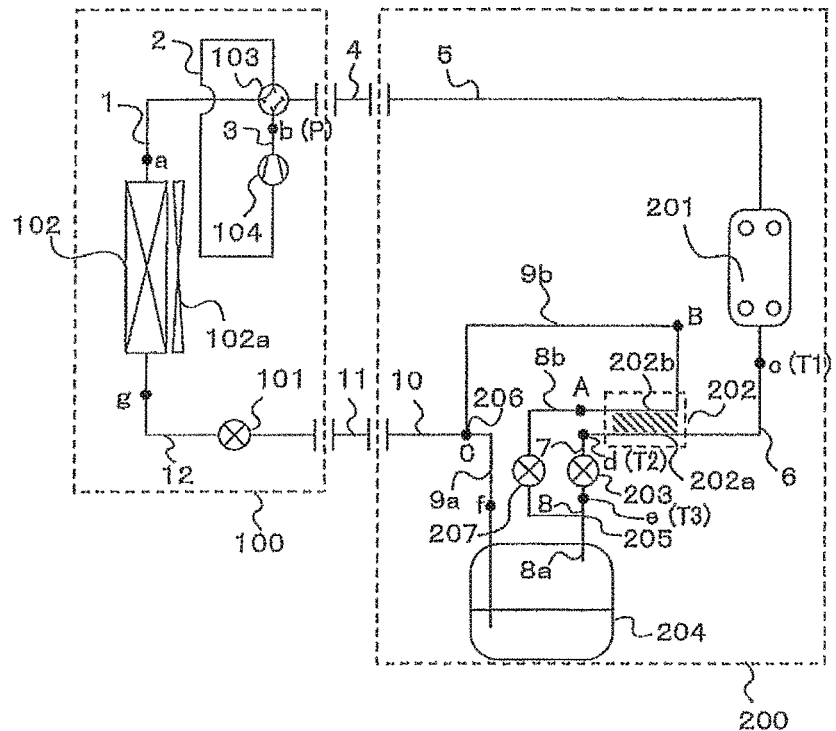
FIG. 8 is a block diagram of Modified Example 1 of the refrigeration cycle apparatus according to Embodiment 2.

FIG. 8 is a block diagram of Modified Example 1 of the refrigeration cycle apparatus according to Embodiment 2.

As illustrated in FIG. 8, Modified Example 1 is different from Embodiment 2 described above in that a third pressure reducing device 207 is provided to the pipe 8b between the branch portion 205 and the low-temperature-side path 202b of the internal heat exchanger 202.

<Effects>

In addition to the effects of Embodiment 2 described above, the third pressure reducing device 207 can control the flow rate of the refrigerant flowing through the low-temperature-side path 202b of the internal heat exchanger 202, and thus, the degree of subcooling of the refrigerant at the outlet of the high-temperature-side path 202a of the internal heat exchanger 202 can be finely controlled.

Embodiment 3

<Configuration>

Figure 9:
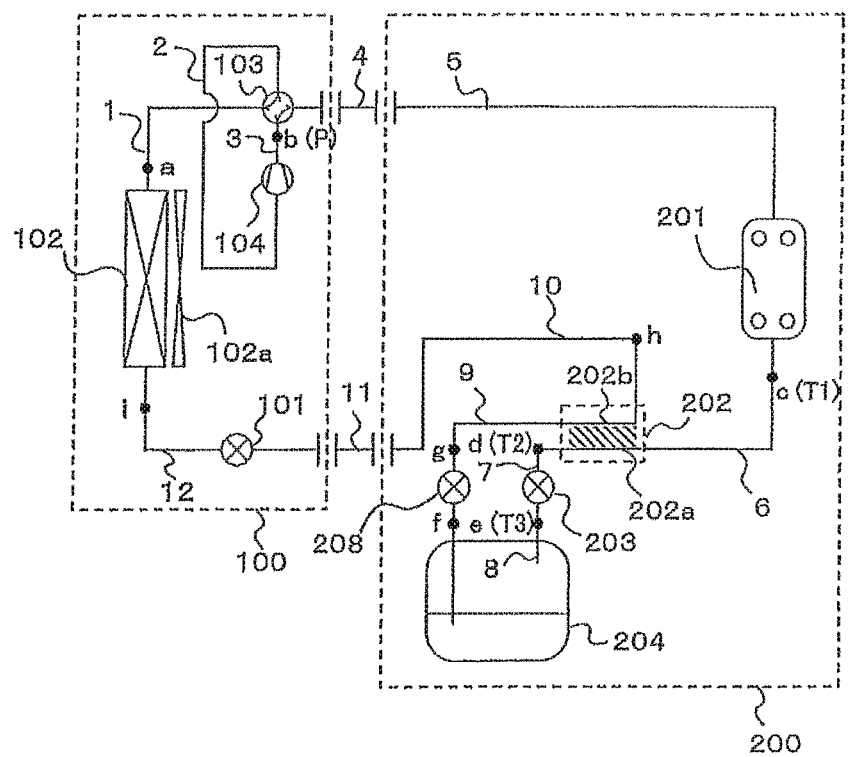
FIG. 9 is a block diagram of a refrigeration cycle apparatus according to Embodiment 3 of the present invention.

FIG. 9 is a block diagram of a refrigeration cycle apparatus according to Embodiment 3 of the present invention.

Figure 10:
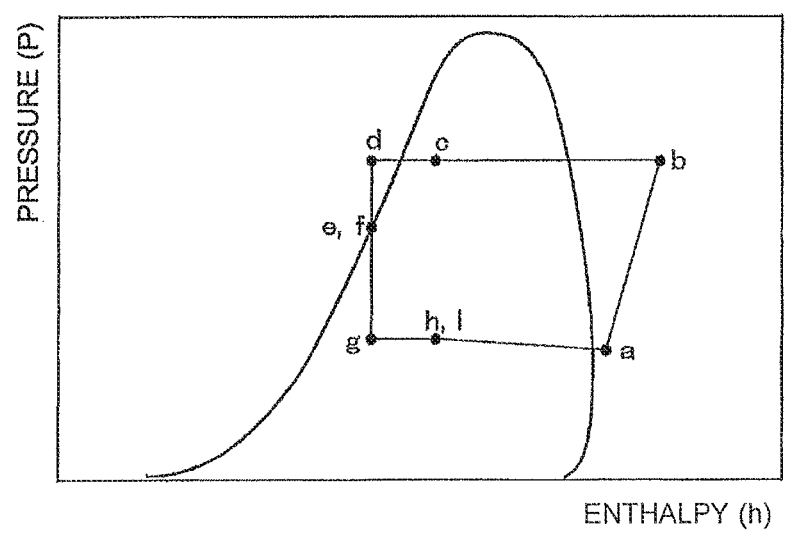
FIG. 10 is a Mollier diagram of the refrigeration cycle apparatus according to Embodiment 3.

FIG. 10 is a Mollier diagram of the refrigeration cycle apparatus according to Embodiment 3.

As illustrated in FIG. 9, the refrigeration cycle apparatus according to Embodiment 3 includes a refrigerant circuit in which the outdoor unit 100 and the heat transfer unit 200 are connected via the gas connection pipe 4 and the liquid connection pipe 11.

The first pressure reducing device 101, the evaporator 102, the four-way valve 103, and the compressor 104 are housed in the outdoor unit 100.

In the outdoor unit 100, the evaporator 102 provided with the fan 102a and the four-way valve 103 are connected via the pipe 1, the four-way valve 103 and the suction side of the compressor 104 are connected via the pipe 2, and the discharge side of the compressor 104 and the gas connection pipe 4 are connected via the pipe 3. Further, the liquid connection pipe 11, the first pressure reducing device 101, and the evaporator 102 are connected via the pipe 12.

Next, the condenser 201 (for example, water-refrigerant heat exchanger), the internal heat exchanger 202, the second pressure reducing device 203, and the refrigerant reservoir 204 are housed in the heat transfer unit 200.

In the heat transfer unit 200, the gas connection pipe 4 and the condenser 201 are connected via the pipe 5, and the condenser 201 and the high-temperature-side path 202a of the internal heat exchanger 202 are connected via the pipe 6. Further, the high-temperature-side path 202a of the internal heat exchanger 202 and the second pressure reducing device 203 are connected via the pipe 7, and the second pressure reducing device 203 and the refrigerant reservoir 204 are connected via the pipe 8. Further, the refrigerant reservoir 204 and the low-temperature-side path 202b of the internal heat exchanger 202 are connected via the pipe 9, and a fourth pressure reducing device 208 is provided to the pipe 9. Further, the low-temperature-side path 202b of the internal heat exchanger 202 and the liquid connection pipe 11 are connected via the pipe 10.

The pressure gauge P configured to detect a discharge pressure of the compressor is provided at the point b in FIG. 9, and the thermometers T1, T2, and T3 configured to detect temperatures of the refrigerant are provided at the point c, the point d, and the point e, respectively.

<Operation>

Description is made with reference to FIG. 9 and FIG. 10. Points a to i in FIG. 9 correspond to state points a to i, respectively, on the Mollier diagram of FIG. 10.

In the refrigeration cycle apparatus according to Embodiment 3, when the compressor 104 is driven, the high pressure vapor refrigerant b compressed by the compressor 104 is condensed by the condenser 201 into the high pressure two-phase gas-liquid refrigerant c and flows into the high-temperature-side path 202a of the internal heat exchanger 202. The high pressure two-phase gas-liquid refrigerant is cooled by the medium pressure two-phase gas-liquid refrigerant in the internal heat exchanger 202 into the subcooled liquid refrigerant d and flows into the second pressure reducing device 203. The high pressure subcooled liquid refrigerant is decompressed in the second pressure reducing device 203 into the medium pressure saturated liquid (or two-phase gas-liquid) refrigerant e and flows into the refrigerant reservoir 204, and the refrigerant is discharged from the refrigerant reservoir 204 in the single-phase liquid state f.

The medium pressure liquid refrigerant in the single-phase liquid state f discharged from the refrigerant reservoir 204 flows into the fourth pressure reducing device 208 and is decompressed into the low pressure two-phase gas-liquid refrigerant g. The low pressure two-phase gas-liquid refrigerant g flows into the internal heat exchanger 202, and exchanges heat while cooling the high pressure two-phase gas-liquid refrigerant from the condenser 201 to become the low pressure two-phase refrigerant h. The low pressure two-phase refrigerant h flows through the liquid connection pipe 11 and flows into the first pressure reducing device 101. At this time, the first pressure reducing device 101 is controlled to be fully open, and the refrigerant flows out of the first pressure reducing device 101 in a state i and flows into the evaporator 102. The refrigerant exchanges heat with air in the evaporator 102 to become the low pressure vapor refrigerant a, and is sucked and compressed again by the compressor 104.

The controller (not shown) detects the temperatures of the refrigerant passing the points c, d, and e with the thermometers T1, T2, and T3, respectively, detects a measurement value of the discharge pressure of the compressor 104, and exercises capacity control over the respective pressure reducing devices and the fan so that the refrigerant at the point d is held at a predetermined degree of subcooling (for example, 5 degrees C.), the refrigerant at the point c is in the two-phase gas-liquid state, and further, the refrigerant at the point e is the saturated liquid or the two-phase refrigerant similar to the saturated liquid.

<Effects>

In the refrigeration cycle apparatus according to Embodiment 3, similarly to the refrigeration cycle apparatus according to Embodiment 1, through increase of the quality of the refrigerant at the outlet of the condenser 201 and discharge of the refrigerant from the condenser 201 in the two-phase gas-liquid state c, the inside of the condenser 201 has no subcooled liquid with an inferior heat transfer property to improve heat exchange ability of the condenser 201. The heat exchange ability of the condenser 201 is improved, and thus, an upper limit of the tapping temperature can be raised from that of the related art (for example, from 55 degrees C. to 60 degrees C.). Further, a condensation pressure when the high temperature hot water is discharged can be set to be low, and thus, efficiency of the refrigeration cycle apparatus can be improved.

Further, the refrigerant flows into the refrigerant reservoir 204 as the saturated liquid or the two-phase gas-liquid refrigerant similar to the saturated liquid, and thus, surplus refrigerant can be stored to the greatest extent. At this time, the refrigerant flows into the refrigerant reservoir 204 under a state in which a gas component is mixed in the refrigerant to some extent, and thus, the inside of the refrigerant reservoir can be prevented from becoming filled up.

Further, the refrigerant at the outlet of the high-temperature-side path 202a of the internal heat exchanger 202 flows into the second pressure reducing device 203 and the fourth pressure reducing device 208 as a single-phase liquid, and thus, flow rate controllability can be improved.

Further, commonality of the configuration of the outdoor unit 100 can be achieved to reduce costs of the refrigeration cycle apparatus.

In addition to the effects of the refrigeration cycle apparatus according to Embodiment 1 described above, the refrigerant decompressed from a high pressure state (state d) to a low pressure state (state g) by the fourth pressure reducing device 208 exchanges heat in the internal heat exchanger 202. Thus, the decompressed refrigerant causes an increased difference between the high pressure and the low pressure in the internal heat exchanger 202, and a heat exchange amount between the high pressure refrigerant and the low pressure refrigerant can be increased.

Further, the refrigerant at the outlet of the refrigerant reservoir 204 is in the single-phase liquid state f and flows into the fourth pressure reducing device 208. Further, the first pressure reducing device 101 is controlled to be fully open, and thus, the flow rate controllability can be improved.

Embodiment 4

<Configuration>

Figure 11:
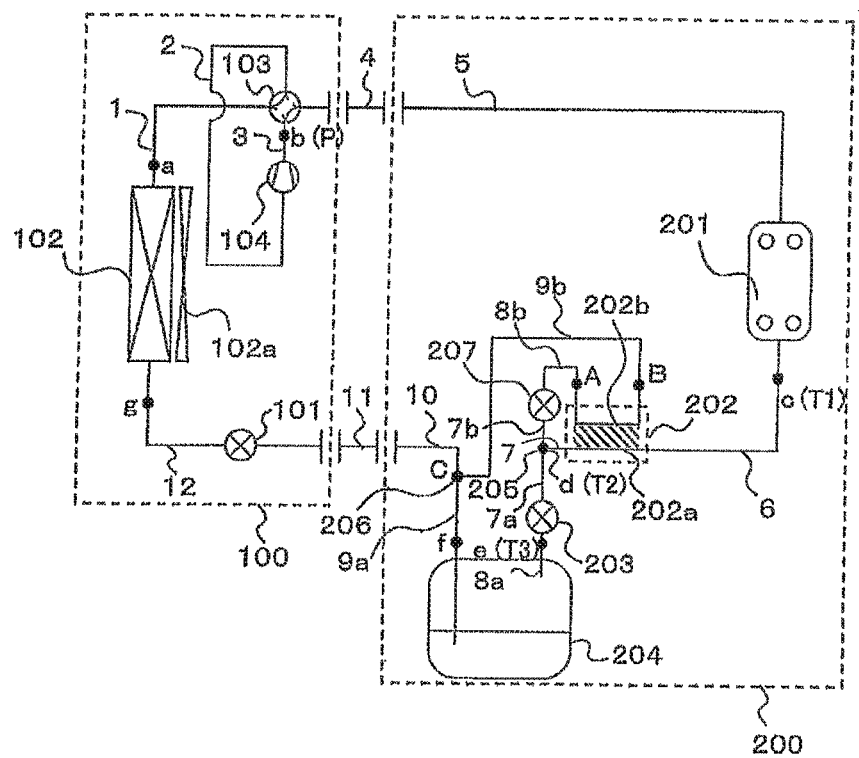
FIG. 11 is a block diagram of a refrigeration cycle apparatus according to Embodiment 4 of the present invention.

FIG. 11 is a block diagram of a refrigeration cycle apparatus according to Embodiment 4 of the present invention.

Figure 12:
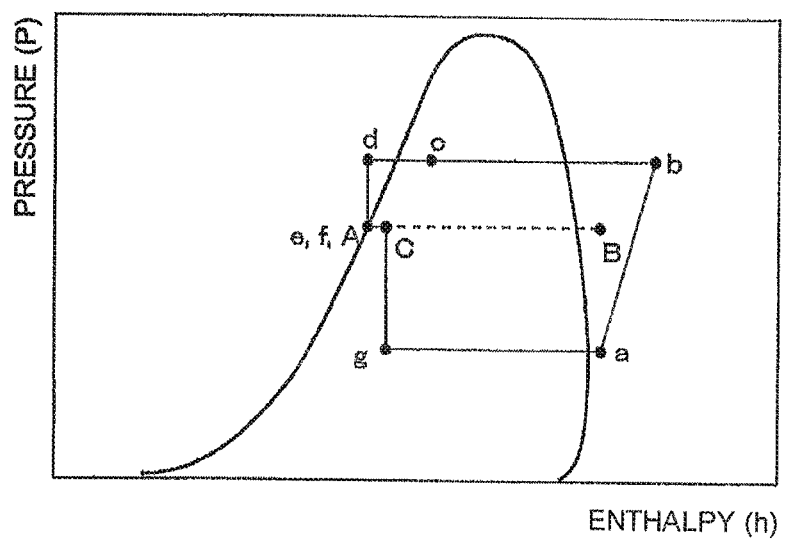
FIG. 12 is a Mollier diagram of the refrigeration cycle apparatus according to Embodiment 4.

FIG. 12 is a Mollier diagram of the refrigeration cycle apparatus according to Embodiment 4.

As illustrated in FIG. 11, the refrigeration cycle apparatus according to Embodiment 4 includes a refrigerant circuit in which the outdoor unit 100 and the heat transfer unit 200 are connected via the gas connection pipe 4 and the liquid connection pipe 11.

The first pressure reducing device 101, the evaporator 102, the four-way valve 103, and the compressor 104 are housed in the outdoor unit 100.

In the outdoor unit 100, the evaporator 102 provided with the fan 102a and the four-way valve 103 are connected via the pipe 1, the four-way valve 103 and the suction side of the compressor 104 are connected via the pipe 2, and the discharge side of the compressor 104 and the gas connection pipe 4 are connected via the pipe 3. Further, the liquid connection pipe 11, the first pressure reducing device 101, and the evaporator 102 are connected via the pipe 12.

Next, the condenser 201 (for example, water-refrigerant heat exchanger), the internal heat exchanger 202, the second pressure reducing device 203, and the refrigerant reservoir 204 are housed in the heat transfer unit 200.

In the heat transfer unit 200, the gas connection pipe 4 and the condenser 201 are connected via the pipe 5, the condenser 201 and the high-temperature-side path 202a of the internal heat exchanger 202 are connected via the pipe 6, and the high-temperature-side path 202a of the internal heat exchanger 202 and the branch portion 205 are connected via the pipe 7. Further, the branch portion 205 and the second pressure reducing device 203 are connected via a pipe 7a, the second pressure reducing device 203 and the refrigerant reservoir 204 are connected via the pipe 8a, and the refrigerant reservoir 204 and the merging portion 206 are connected via the pipe 9a. Further, the branch portion 205 and the third pressure reducing device 207 (closed during normal operation) are connected via a pipe 7b. The third pressure reducing device 207 and the low-temperature-side path 202b of the internal heat exchanger 202 are connected via the pipe 8b, the low-temperature-side path 202b of the internal heat exchanger 202 and the merging portion 206 are connected via the pipe 9b, and the merging portion 206 and the liquid connection pipe 11 are connected via the pipe 10.

The pressure gauge P configured to detect a discharge pressure of the compressor is provided at the point b in FIG. 11, and the thermometers T1, T2, and T3 configured to detect temperatures of the refrigerant are provided at the point c, the point d, and the point e, respectively.

<Operation>

Description is made with reference to FIG. 11 and FIG. 12. Points a to g and A to C in FIG. 11 correspond to state points a to g and A to C, respectively, on the Mollier diagram of FIG. 12.

1) During High Pressure Rise Suppression Operation

In the refrigeration cycle apparatus according to Embodiment 4, when the compressor 104 is driven, the high pressure vapor refrigerant b compressed by the compressor 104 is condensed by the condenser 201 into the high pressure two-phase gas-liquid refrigerant c and flows into the internal heat exchanger 202. The high pressure two-phase gas-liquid refrigerant is cooled by the medium pressure two-phase gas-liquid refrigerant in the internal heat exchanger 202 into the subcooled liquid refrigerant d and flows into the branch portion 205. The refrigerant branches from the branch portion 205 into the second pressure reducing device 203 and the third pressure reducing device 207. The high pressure subcooled liquid refrigerant is decompressed in the second pressure reducing device 203 into the medium pressure liquid refrigerant e and flows into the refrigerant reservoir 204. The refrigerant flows out in the single-phase liquid state f to flow into the merging portion 206.

The refrigerant flowing into the third pressure reducing device 207 flows out in the medium pressure two-phase gas-liquid refrigerant state A. The medium pressure two-phase gas-liquid refrigerant flows into the internal heat exchanger 202 to be in the state B while cooling the high pressure two-phase gas-liquid refrigerant from the condenser 201 and flows into the merging portion 206. The superheated refrigerant B becomes the medium pressure two-phase gas-liquid refrigerant state C at the merging portion 206, flows through the liquid connection pipe 11, and flows into the first pressure reducing device 101. The refrigerant is decompressed in the first pressure reducing device 101 into the low pressure two-phase gas-liquid refrigerant g and flows into the evaporator 102. The refrigerant exchanges heat with air in the evaporator 102 to become the low pressure vapor refrigerant a, and is sucked and compressed again by the compressor 104.

The controller (not shown) detects the temperatures of the refrigerant passing the points c, d, and e with the thermometers T1, T2, and T3, respectively, detects a measurement value of the discharge pressure of the compressor 104, and exercises capacity control over the respective pressure reducing devices and the fan so that the refrigerant at the point d is held at a predetermined degree of subcooling (for example, 5 degrees C.), the refrigerant at the point c is in the two-phase gas-liquid state, and further, the refrigerant at the point e is the saturated liquid or the two-phase refrigerant similar to the saturated liquid.

2) During Normal Operation (Third Pressure Reducing Device 207 is Closed)

The high pressure single-phase liquid refrigerant c discharged from the condenser 201 flows into the second pressure reducing device 203 to be decompressed by the second pressure reducing device 203 into the medium pressure two-phase gas-liquid refrigerant e, and flows into the refrigerant reservoir 204. The refrigerant flows out in the single-phase liquid state f, flows through the liquid connection pipe 11, and flows into the first pressure reducing device 101. The liquid refrigerant is decompressed in the first pressure reducing device 101 to be in the state g, and flows into the evaporator 102. The low pressure vapor refrigerant a exchanging heat with air in the evaporator 102 is sucked and compressed again by the compressor 104.

<Effects>

In the refrigeration cycle apparatus according to Embodiment 4, in the high pressure rise suppression operation, similarly to the refrigeration cycle apparatus according to Embodiment 1, through increase of the quality of the refrigerant at the outlet of the condenser 201 and discharge of the refrigerant from the condenser 201 in the two-phase gas-liquid state c, the inside of the condenser 201 has no subcooled liquid with an inferior heat transfer property to improve heat exchange ability of the condenser 201. The heat exchange ability of the condenser 201 is improved, and thus, an upper limit of the tapping temperature can be raised from that of the related art (for example, from 55 degrees C. to 60 degrees C.). Further, a condensation pressure when the high temperature hot water is discharged can be set to be low, and thus, efficiency of the refrigeration cycle apparatus can be improved.

Further, the refrigerant flows into the refrigerant reservoir 204 as the saturated liquid or the two-phase gas-liquid refrigerant similar to the saturated liquid, and thus, surplus refrigerant can be stored to the greatest extent. At this time, the refrigerant flows into the refrigerant reservoir 204 under a state in which a gas component is mixed in the refrigerant to some extent, and thus, the inside of the refrigerant reservoir can be prevented from becoming filled up.

Further, the refrigerant at the outlet of the high-temperature-side path 202a of the internal heat exchanger 202 flows into the second pressure reducing device 203 and the third pressure reducing device 207 as a single-phase liquid, and thus, flow rate controllability can be improved.

Further, commonality of the configuration of the outdoor unit 100 can be achieved to reduce costs of the refrigeration cycle apparatus.

In addition to the effects described above, the third pressure reducing device 207 can control the flow rate of the refrigerant flowing through the low-temperature-side path 202b of the internal heat exchanger 202, and thus, the degree of subcooling at the point d can be finely controlled.

Further, in the normal operation, through control of the degree of subcooling at the outlet of the condenser 201 with the temperature and the pressure at the outlet of the condenser 201, the heat exchange amount of the condenser 201 can be improved.

Modified Example 1

Modified Example 1 of the refrigeration cycle apparatus according to Embodiment 4 is described with reference to FIG. 13 and FIG. 14.

Figure 13:
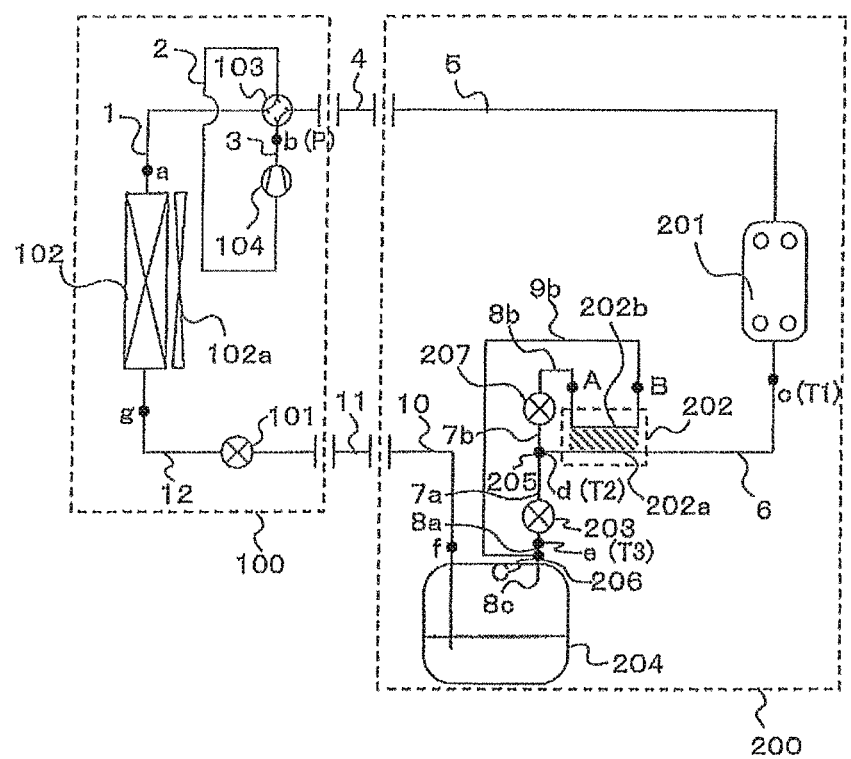
FIG. 13 is a block diagram of Modified Example 1 of the refrigeration cycle apparatus according to Embodiment 4.

FIG. 13 is a block diagram of Modified Example 1 of the refrigeration cycle apparatus according to Embodiment 4.

Figure 14:
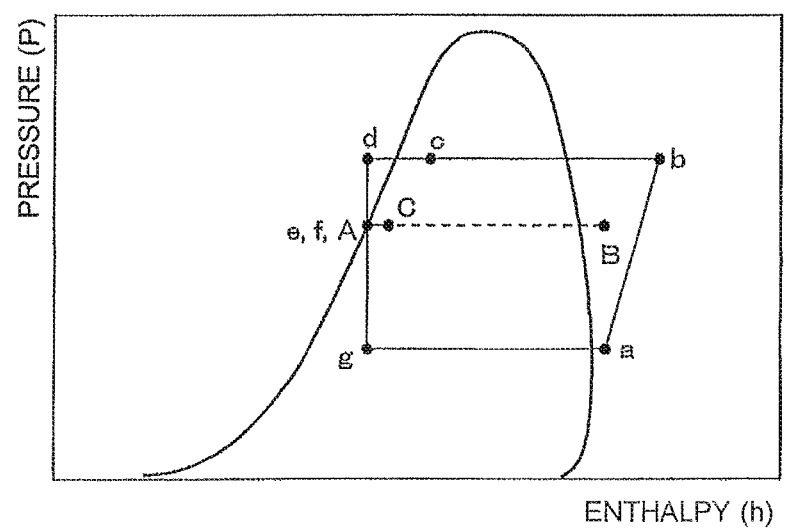
FIG. 14 is a Mollier diagram of Modified Example 1 of the refrigeration cycle apparatus according to Embodiment 4.

FIG. 14 is a Mollier diagram of Modified Example 1 of the refrigeration cycle apparatus according to Embodiment 4.

As illustrated in FIG. 13, Modified Example 1 is different from Embodiment 4 described above in that the merging portion 206 of the pipe 9b is provided on a downstream side of the second pressure reducing device 203. Specifically, the second pressure reducing device 203 and the merging portion 206 are connected via the pipe 8a, the merging portion 206 and the refrigerant reservoir 204 are connected via a pipe 8c, and the refrigerant reservoir 204 and the liquid connection pipe 11 are connected via the pipe 10.
<Effects>

In addition to the effects of Embodiment 4 described above, the refrigerant at the outlet of the refrigerant reservoir 204 in the single-phase liquid state f flows into the first pressure reducing device 101, and thus, the flow rate controllability can be prevented from being lowered.

Embodiment 5

<Configuration>

Figure 15:
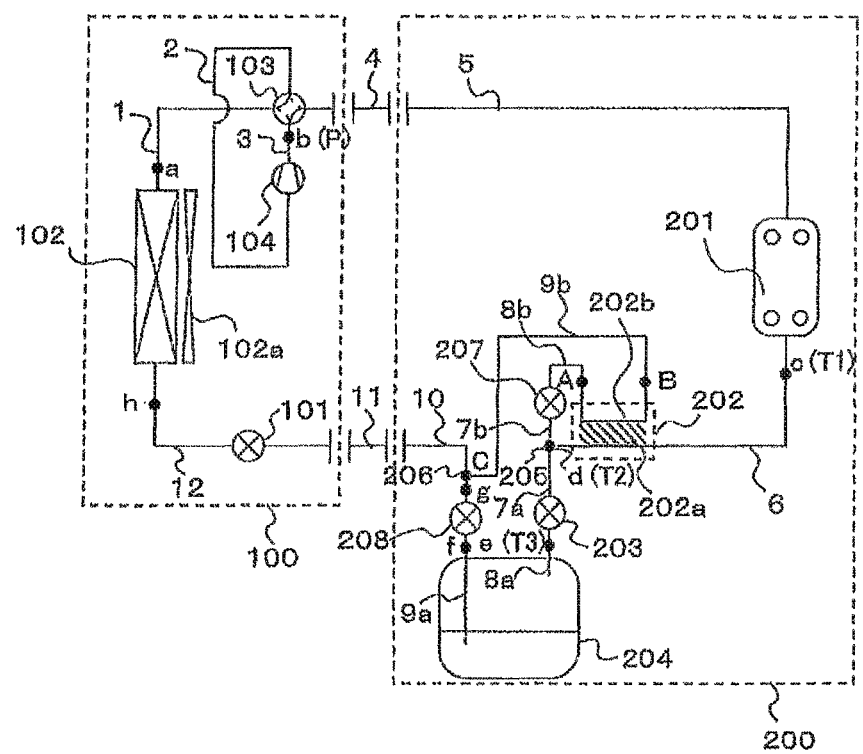
FIG. 15 is a block diagram of a refrigeration cycle apparatus according to Embodiment 5 of the present invention.

FIG. 15 is a block diagram of a refrigeration cycle apparatus according to Embodiment 5 of the present invention.

Figure 16:
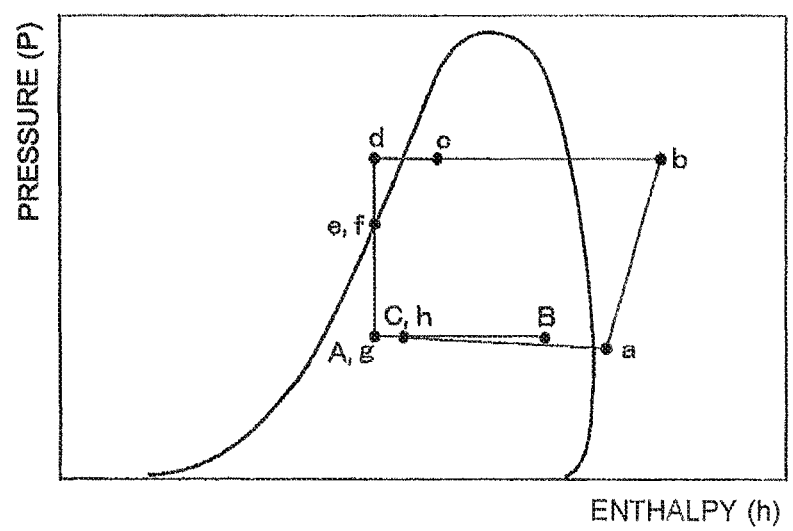
FIG. 16 is a Mollier diagram of the refrigeration cycle apparatus according to Embodiment 5.

FIG. 16 is a Mollier diagram of the refrigeration cycle apparatus according to Embodiment 5.

As illustrated in FIG. 15, the refrigeration cycle apparatus according to Embodiment 5 includes a refrigerant circuit in which the outdoor unit 100 and the heat transfer unit 200 are connected via the gas connection pipe 4 and the liquid connection pipe 11.

In the refrigeration cycle apparatus according to Embodiment 5, the fourth pressure reducing device 208 is provided to the pipe 9a of the heat transfer unit 200 of the refrigeration cycle apparatus according to Embodiment 4.
<Operation>

Description is made with reference to FIG. 15 and FIG. 16. Points a to h and A to C in FIG. 15 correspond to state points a to h and A to C, respectively, on the Mollier diagram of FIG. 16.

1) During High Pressure Rise Suppression Operation

The high pressure vapor refrigerant b compressed by the compressor 104 is condensed by the condenser 201 into the high pressure two-phase gas-liquid refrigerant c and flows into the internal heat exchanger 202. The high pressure two-phase gas-liquid refrigerant is cooled by the medium pressure two-phase gas-liquid refrigerant in the internal heat exchanger 202 into the subcooled liquid refrigerant d and flows into the branch portion 205. The refrigerant branches from the branch portion 205 into the second pressure reducing device 203 and the third pressure reducing device 207. The high pressure subcooled liquid refrigerant is decompressed in the second pressure reducing device 203 into the medium pressure liquid refrigerant e and flows into the refrigerant reservoir 204. The refrigerant flows out in the medium pressure liquid refrigerant state f. The medium pressure liquid refrigerant flows into and is decompressed by the fourth pressure reducing device 208 into the low pressure two-phase gas-liquid refrigerant g, and flows into the merging portion 206.

The refrigerant flowing into the third pressure reducing device 207 is decompressed and flows out in the low pressure two-phase gas-liquid refrigerant state A. The low pressure two-phase gas-liquid refrigerant flows into the internal heat exchanger 202 and exchanges heat while cooling the high pressure two-phase gas-liquid refrigerant from the condenser 201. The refrigerant in the state B flowing out of the internal heat exchanger 202 flows into the merging portion 206. The refrigerant in the state B becomes the low pressure two-phase gas-liquid refrigerant C at the merging portion 206, flows through the liquid connection pipe 11, and flows into the first pressure reducing device 101. At this time, the first pressure reducing device 101 is controlled to be fully open, and the refrigerant flows out of the first pressure reducing device 101 in a state h and flows into the evaporator 102. The refrigerant exchanges heat with air in the evaporator 102 to become the low pressure vapor refrigerant a, and is sucked and compressed again by the compressor 104.

The controller (not shown) detects the temperatures of the refrigerant passing the points c, d, and e with the thermometers T1, T2, and T3, respectively, detects a measurement value of the discharge pressure of the compressor 104, and exercises capacity control over the respective pressure reducing devices and the fan so that the refrigerant at the point d is held at a predetermined degree of subcooling (for example, 5 degrees C.), the refrigerant at the point c is in the two-phase gas-liquid state, and further, the refrigerant at the point e is the saturated liquid or the two-phase refrigerant similar to the saturated liquid.

2) During Normal Operation (Third Pressure Reducing Device 207 is Fully Closed)

The high pressure single-phase liquid refrigerant c flowing out of the condenser 201 flows into the second pressure reducing device 203 to be decompressed by the second pressure reducing device 203 into the medium pressure two-phase gas-liquid refrigerant e. The refrigerant then flows into the refrigerant reservoir 204, flows out in the single-phase liquid state f, and flows into the first pressure reducing device 101. The liquid refrigerant is decompressed in the first pressure reducing device 101 to be in the state h, and flows into the evaporator 102. The refrigerant exchanges heat with air in the evaporator 102 to become the low pressure vapor refrigerant a, and is sucked and compressed again by the compressor 104.
<Effects>

In the refrigeration cycle apparatus according to Embodiment 5, similarly to the refrigeration cycle apparatus according to Embodiment 1, through increase of the quality of the refrigerant at the outlet of the condenser 201 and discharge of the refrigerant from the condenser 201 in the two-phase gas-liquid state c, the inside of the condenser 201 has no subcooled liquid with an inferior heat transfer property to improve heat exchange ability of the condenser 201. The heat exchange ability of the condenser 201 is improved, and thus, an upper limit of the tapping temperature can be raised from that of the related art (for example, from 55 degrees C. to 60 degrees C.). Further, a condensation pressure when the high temperature hot water is discharged can be set to be low, and thus, efficiency of the refrigeration cycle apparatus can be improved.

Further, the refrigerant flows into the refrigerant reservoir 204 as the saturated liquid or the two-phase gas-liquid refrigerant similar to the saturated liquid, and thus, surplus refrigerant can be stored to the greatest extent. At this time, the refrigerant flows into the refrigerant reservoir 204 under a state in which a gas component is mixed in the refrigerant to some extent, and thus, the inside of the refrigerant reservoir can be prevented from becoming filled up.

Further, the refrigerant at the outlet of the high-temperature-side path 202a of the internal heat exchanger 202 flows into the second pressure reducing device 203 and the third pressure reducing device 207 as a single-phase liquid, and thus, flow rate controllability can be improved.

Further, commonality of the configuration of the outdoor unit 100 can be achieved to reduce costs of the refrigeration cycle apparatus.

Further, in the refrigeration cycle apparatus according to Embodiment 5, the third pressure reducing device 207 causes the internal heat exchanger 202 to exchange heat between the low pressure refrigerant and the high pressure refrigerant, and thus the heat exchange amount can be improved.

Embodiment 6

<Configuration>

Figure 17:
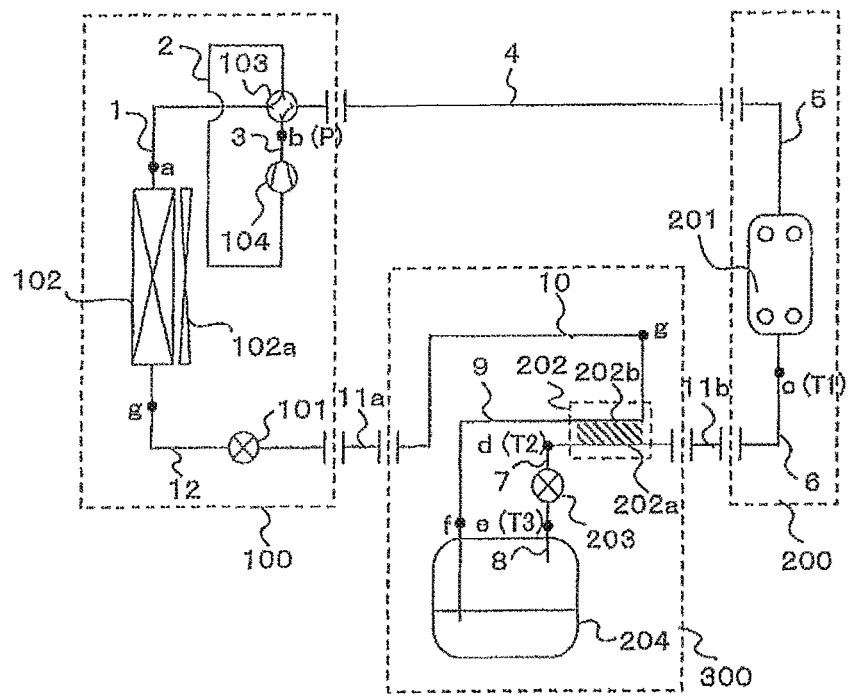
FIG. 17 is a block diagram of a refrigeration cycle apparatus according to Embodiment 6 of the present invention.

FIG. 17 is a block diagram of a refrigeration cycle apparatus according to Embodiment 6 of the present invention.

As illustrated in FIG. 17, in the refrigeration cycle apparatus according to Embodiment 6, the outdoor unit 100, a high pressure rise suppression unit 300, and the heat transfer unit 200 are connected via the gas connection pipe 4, a first liquid connection pipe 11a, and a second liquid connection pipe 11b.

The first pressure reducing device 101, the evaporator 102, the four-way valve 103, and the compressor 104 are housed in the outdoor unit 100.

The condenser 201 (for example, water-refrigerant heat exchanger) is housed in the heat transfer unit 200.

The internal heat exchanger 202, the second pressure reducing device 203, and the refrigerant reservoir 204 are housed in the high pressure rise suppression unit 300.

The configuration of connecting pipes is similar to that in Embodiment 1.

<Operation>

Operation of the refrigeration cycle apparatus according to Embodiment 6 is similar to that in Embodiment 1.

<Effects>

The refrigeration cycle apparatus according to Embodiment 6 has, in addition to the effects of Embodiment 1, independently providing the high pressure rise suppression unit 300 achieves commonality of the configuration of the outdoor unit 100 and the configuration of the heat transfer unit 200. Further, commonality of the configuration of the outdoor unit 100 and the configuration of the heat transfer unit 200 enables cost reduction.

Embodiment 7

<Configuration>

Figure 18:
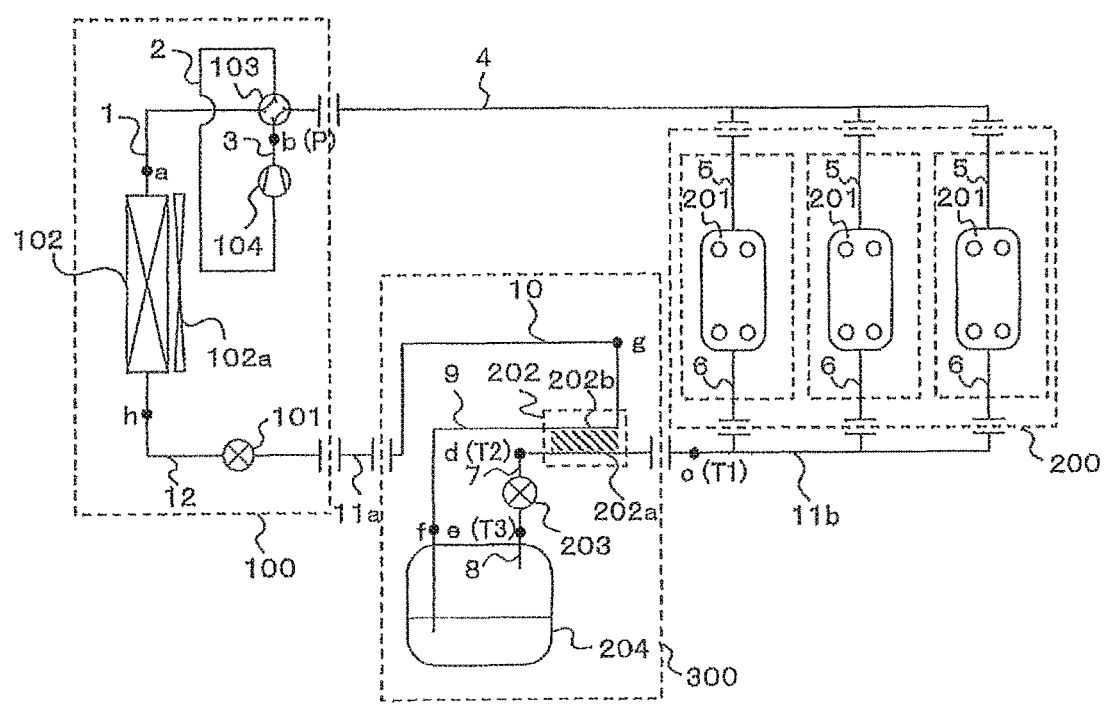
FIG. 18 is a block diagram of a refrigeration cycle apparatus according to Embodiment 7 of the present invention.

FIG. 18 is a block diagram of a refrigeration cycle apparatus according to Embodiment 7 of the present invention.

As illustrated in FIG. 18, in the refrigeration cycle apparatus according to Embodiment 7, the outdoor unit 100, the high pressure rise suppression unit 300, and a plurality of heat transfer units 200 connected in parallel with the outdoor unit 100 are connected via the gas connection pipe 4, the first liquid connection pipe 11a, and the second liquid connection pipe 11b.

The configuration of connecting pipes is similar to that in Embodiment 1.

<Operation>

Operation of the refrigeration cycle apparatus according to Embodiment 7 is similar to that in Embodiment 1.

<Effects>

The refrigeration cycle apparatus according to Embodiment 7 has, in addition to the effects of Embodiment 1, an effect that one outdoor unit 100 and one high pressure rise suppression unit 300 can suppress high pressure rise of the condensers 201 of the plurality of heat transfer units 200.

The invention claimed is:

1. A refrigeration cycle apparatus comprising:
a compressor;
a condenser;
an internal heat exchanger configured to exchange heat between a refrigerant at different pressures;
a refrigerant reservoir configured to store the refrigerant;
a first pressure reducing valve;
a refrigerant flow path in which the refrigerant flows through an evaporator, the compressor, the condenser, the internal heat exchanger, the refrigerant reservoir, the first pressure reducing valve, and the evaporator in this order;
a first pipe extending from the condenser to the refrigerant reservoir;
a second pressure reducing valve provided on the first pipe between the internal heat exchanger and the refrigerant reservoir;
a second pipe extending from the refrigerant reservoir to the first pressure reducing valve; and
a third pressure reducing valve provided on the second pipe between the refrigerant reservoir and the internal heat exchanger, wherein
the internal heat exchanger is configured to exchange heat between a high pressure refrigerant located in the first pipe between the condenser and the second pressure reducing valve, and a low pressure refrigerant having a pressure lower than a pressure of the high pressure refrigerant located in the second pipe between the refrigerant reservoir and the first pressure reducing valve.

2. The refrigeration cycle apparatus of claim 1, wherein the refrigerant decompressed by the second pressure reducing valve and flowing into the refrigerant reservoir is in a saturated liquid state.

3. The refrigeration cycle apparatus of claim 1, wherein the refrigerant flowing out of the condenser is in a two-phase gas-liquid state.

4. The refrigeration cycle apparatus of claim 1, further comprising:
an outdoor unit housing at least the compressor, the evaporator, and the first pressure reducing valve; and
a heat transfer unit housing at least the condenser, the internal heat exchanger, the refrigerant reservoir, and the second pressure reducing valve.

5. The refrigeration cycle apparatus of claim 1, further comprising:
an outdoor unit housing at least the compressor, the evaporator, and the first pressure reducing valve;
a heat transfer unit housing at least the condenser; and
a high pressure rise suppression unit housing at least the internal heat exchanger, the refrigerant reservoir, and the second pressure reducing valve.

6. The refrigeration cycle apparatus of claim 1, further comprising:
an outdoor unit housing at least the compressor, the evaporator, and the first pressure reducing valve;
a plurality of heat transfer units each housing at least the condenser; and a high pressure rise suppression unit housing at least the internal heat exchanger, the refrigerant reservoir, and the second pressure reducing valve.

\* \* \* \* \*